United States Patent
Wei et al.

(10) Patent No.: US 12,540,370 B2
(45) Date of Patent: Feb. 3, 2026

(54) METHOD FOR EXTRACTING LITHIUM FROM SALT LAKE BRINE

(71) Applicant: BYD COMPANY LIMITED, Guangdong (CN)

(72) Inventors: Jialiang Wei, Shenzhen (CN); Hongye Lin, Shenzhen (CN); Junlan Lian, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 626 days.

(21) Appl. No.: 18/089,344

(22) Filed: Dec. 27, 2022

(65) Prior Publication Data
US 2023/0203619 A1 Jun. 29, 2023

(30) Foreign Application Priority Data
Dec. 28, 2021 (CN) .......................... 202111630401.1

(51) Int. Cl.
*C22B 26/12* (2006.01)
*C22B 3/24* (2006.01)

(52) U.S. Cl.
CPC ................ *C22B 26/12* (2013.01); *C22B 3/24* (2013.01)

(58) Field of Classification Search
None
See application file for complete search history.

(56) References Cited

U.S. PATENT DOCUMENTS

| | | | |
|---|---|---|---|
| 9,994,931 B2 * | 6/2018 | Chon | C22B 3/42 |
| 11,638,916 B1 * | 5/2023 | Jones | C02F 1/485 |
| | | | 210/222 |
| 2016/0214869 A1 * | 7/2016 | Chung | C22B 26/12 |
| 2017/0333867 A1 * | 11/2017 | Cheng | B01J 20/28004 |
| 2018/0245180 A1 * | 8/2018 | Cheng | B01J 20/28004 |
| 2019/0248667 A1 * | 8/2019 | Featherstone | B01D 15/361 |
| 2019/0275473 A1 * | 9/2019 | Bhave | C22B 3/24 |
| 2021/0221697 A1 | 7/2021 | Xiang et al. | |

FOREIGN PATENT DOCUMENTS

| | | |
|---|---|---|
| CN | 101928828 A | 12/2010 |
| CN | 102031368 A | 4/2011 |
| CN | 102824759 A | 12/2012 |
| CN | 104014308 A | 9/2014 |
| CN | 108543514 A | 9/2018 |
| CN | 108996528 A | 12/2018 |
| CN | 109266851 A | 1/2019 |
| CN | 109759006 A | 5/2019 |

(Continued)

*Primary Examiner* — John J Figueroa
(74) *Attorney, Agent, or Firm* — Sheppard Mullin Richter & Hampton LLP

(57) ABSTRACT

The present disclosure provides a method for extracting lithium from salt lake brine, which includes: flowing the salt lake brine through a lithium adsorbent at a varying flow rate to obtain a lithium-rich adsorbent, where the lithium ions in the salt lake brine are adsorbed on the lithium adsorbent, and where during the adsorption process, the flow rate of the salt lake brine decreases, and a difference between the initial flow rate and the final flow rate of the salt lake brine is 0.5-3 BV/h; washing the lithium-rich adsorbent; and desorbing the lithium ions from the washed lithium-rich adsorbent with a lithium ion eluent, to obtain a desorption solution.

15 Claims, 2 Drawing Sheets

(56) References Cited

FOREIGN PATENT DOCUMENTS

| | | | |
|---|---|---|---|
| CN | 110215896 | A | 9/2019 |
| CN | 110743516 | A | 2/2020 |
| CN | 210795792 | U | 6/2020 |
| CN | 111826524 | A | 10/2020 |
| CN | 112142076 | A | 12/2020 |
| CN | 112538575 | A | 3/2021 |
| EP | 2532759 | A1 | 12/2012 |
| JP | 2020097011 | A | 6/2020 |

* cited by examiner

METHOD FOR EXTRACTING LITHIUM FROM SALT LAKE BRINE

CROSS-REFERENCE TO RELATED APPLICATIONS

This application is based on and claims priority to and benefits of Chinese Patent Application No. 202111630401.1, filed on Dec. 28, 2021. The entire content of the above-referenced application is incorporated herein by reference.

FIELD

The present disclosure relates to the fields of environmental protection and resource recycling, and specifically, to a method for extracting lithium from salt lake brine.

BACKGROUND

Most of China's lithium resources are stored in salt lake brine, which is largely brine with high magnesium-lithium ratio. Therefore, extraction of lithium from brine with a high magnesium-lithium ratio has become a focus in lithium resource development in China. The adsorption method developed recently is widely used due to a good selectivity for lithium ions, simple process, the capability to extract lithium from salt lake brine with a high magnesium-lithium ratio, a low cost, and other advantages.

However, the lithium extraction process by adsorption method has the problem of low adsorption efficiency for lithium, and difficulty in producing a qualified desorption solution with a high lithium content at a low temperature (such as in winter).

SUMMARY

In view of this, the present disclosure provides a method for extracting lithium from salt lake brine, in which a rate-varying adsorption process is employed in the brine adsorption stage, to greatly improve the adsorption efficiency of lithium in brine, and solve the problem of difficulty in obtaining a qualified desorption solution with a high lithium content at a low temperature. This guarantees the uninterrupted production all year round.

The present disclosure provides a method for extracting lithium from salt lake brine, which includes the following steps:
  (1) flowing the salt lake brine through a lithium adsorbent at a varying flow rate to obtain a lithium-rich adsorbent, where the lithium ions in the salt lake brine are adsorbed on the lithium adsorbent, and where during the adsorption process, the flow rate of the salt lake brine decreases, and a difference between the initial flow rate of the salt lake brine and the final flow rate of the salt lake brine is 0.5-3 BV/h;
  (2) washing the lithium-rich adsorbent; and
  (3) desorbing the lithium ions from the washed lithium-rich adsorbent with a lithium ion eluent, to obtain a desorption solution.

In an embodiment of the present disclosure, based on the weight of the lithium adsorbent, a content of the adsorbent material is 80-95 wt %, a content of the binder is 4-17 wt %, and a content of the wetting and dispersing agent is 1-5 wt %.

In some embodiments of the present disclosure, the binder accounts for 8-12.5% by weight of the adsorbent material.

In some embodiments of the present disclosure, a ratio of the weight of a adsorbent material to a total weight of the binder and the wetting and dispersing agent is 8:1 or more.

According to the present disclosure, in Step (2), the washing of the lithium-rich adsorbent is mainly to wash away impurities on the surface of the lithium-rich adsorbent that has adsorbed lithium ions.

In an embodiment of the present disclosure, the washing includes a 1st wash, a 2nd wash and a 3rd wash. The flow rate of a first detergent in the 1st wash, the flow rate of a second detergent in the 2nd wash, and the flow rate of a third detergent in the 3rd wash are increased sequentially (that is, the flow rate of the first detergent<the flow rate of the second detergent<the flow rate of the third detergent). An amount of the second detergent is greater than an amount of the first detergent or an amount of the third detergent. The amount of the first detergent and the amount third detergent may be the same or different.

In some embodiments of the present disclosure, the washing includes three steps, including a 1st wash, in which the flow rate of a first detergent is 3-5 BV/h, and the amount of the first detergent is 0.5-1 BV; a 2nd wash, in which the flow rate of a second detergent is 6-8 BV/h, and the amount of the second detergent is 1-1.5 BV; and a 3rd wash, in which the flow rate of a third detergent is 9-12 BV/h, and the amount of the third detergent is 0.5-1 BV.

In the method for extracting lithium from salt lake brine provided in the present disclosure, a rate-varying adsorption process is employed in the adsorption stage of salt lake brine, to effectively improve the adsorption efficiency of lithium in brine, thus solving the problem that it is difficult to obtain a qualified desorption solution with high lithium content at a low temperature (brine is generally not frozen in winter at a temperature that is as low as minus ten degrees Celsius). This guarantees the uninterrupted production all year round. The method for extracting lithium from salt lake brine has simple process, and a high lithium extraction and recovery rate, thus being suitable for large-scale industrial production.

DETAILED DESCRIPTION

Figure 1:
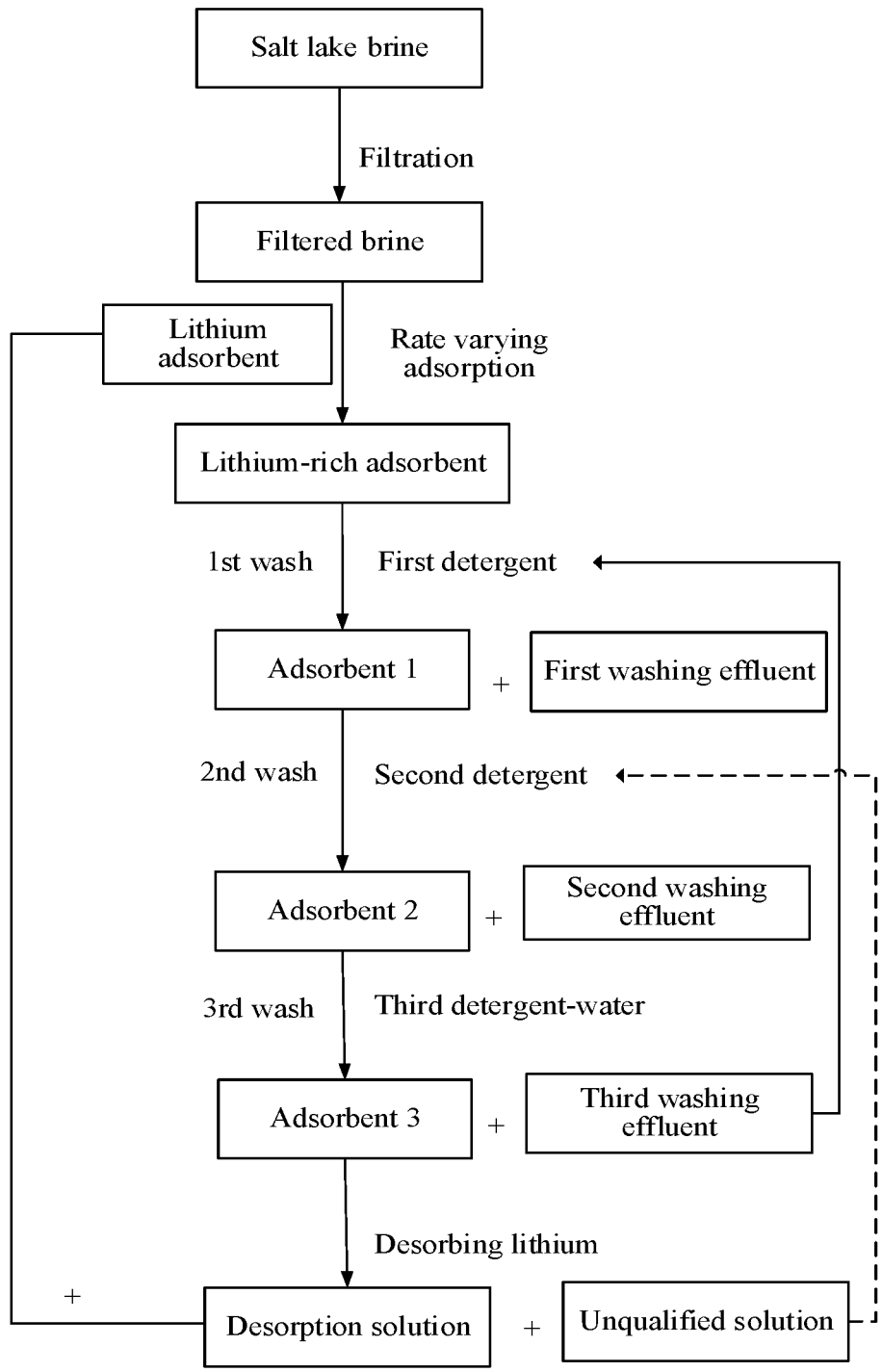
FIG. 1 shows a flow chart of a method for extracting lithium from salt lake brine provided in an embodiment of the present disclosure.

The technical solutions of the embodiments of the present disclosure are described in detail below in combination with multiple examples.

The present disclosure provides a method for extracting lithium from salt lake brine, which includes the following steps:
  (1) flowing the salt lake brine through a lithium adsorbent at a varying flow rate to obtain a lithium-rich adsorbent, where the lithium ions in the salt lake brine are adsorbed on the lithium adsorbent, and where during the adsorption process, the flow rate of the salt lake brine decreases, and a difference between the initial flow rate of the salt lake brine and the final flow rate of the salt lake brine is 0.5-3 BV/h;

(2) washing the lithium-rich adsorbent; and (3) desorbing the lithium ions from the washed lithium-rich adsorbent with a lithium ion eluent, to obtain a desorption solution.

In the method for extracting lithium from salt lake brine provided in the present disclosure, a rate-varying adsorption process in which the flow rate of the brine decreases gradually is employed in the adsorption stage of salt lake brine, to greatly improve the adsorption efficiency of lithium in brine, and achieve high-efficiency adsorption of lithium at a low temperature (below zero Celsius degree). As a result, a desorption solution with a lithium content of 500 mg/L or higher can be obtained without affecting the production capacity. With the same adsorption time (for example, 180 min), while the production capacity is kept unchanged, the lithium content in the desorption solution obtained by the lithium extraction method of the present disclosure is much higher than that the lithium content in a desorption solution obtained by a conventional lithium extraction method using a brine adsorption process with a constant flow rate (generally about 400 mg/L).

In the present disclosure, the flow rate of salt lake brine varies over time during the adsorption process, and the flow rate decreases gradually as the adsorption proceeds. The difference between the initial flow rate of the salt lake brine and the final flow rate of salt lake brine is 0.5-3 BV/h, for example, 0.8 BV/h, 1 BV/h, 1.2 BV/h, 1.5 BV/h, 1.8 BV/h, 2 BV/h or 2.5 BV/h. A suitable difference between the initial flow rate and the final flow rate promotes the improvement of the adsorption efficiency of lithium in brine.

The initial flow rate and the final flow rate can be defined according to the rate-varying adsorption process of brine. If the flow rate of brine decreases constantly, the initial flow rate is the flow rate of brine that first passes through the lithium adsorbent when the adsorption begins, and the final flow rate is the flow rate of salt lake brine that finally passes through the lithium adsorbent when the adsorption is about to end. If the flow rate of brine is discretely decreased in stages, that is, the flow rate of brine has n different values (n is definite, and the flow rates may be $V_1$, $V_2$, . . . and $V_n$) during the adsorption process, the 1st flow rate interval (the flow rate is $V_1$) is the initial flow rate of brine, the last flow rate interval (that is, the nth flow rate interval, the flow rate is $V_n$) is the final flow rate. If the total amount of brine to be adsorbed is Q (in Bv), the amount of brine flowing through the adsorbent in each flow rate interval can be Q/n. The flow rate of the 1st Q/n BV of salt lake brine through the lithium adsorbent is referred to as the initial flow rate. The flow rate of the last Q/n BV of salt lake brine through the lithium adsorbent is referred to as the final flow rate. For example, when 6 BV of salt lake brine need to be adsorbed, and each BV of brine is flowed through the lithium adsorbent respectively at a flow rate of 2.5 BV/h, 2.3 BV/h, 2.1 BV/h, 2.0 BV/h, 1.8 BV/h, and 1.6 BV/h, where the initial flow rate of brine is 2.5 BV/h, the final flow rate is 1.6 BV/h, and the adsorption time of each brine was respectively 24 min, 26 min, 28.6 min, 30 min, 33 min, and 37.5 min.

In some embodiments of the present disclosure, the initial flow rate is 2.0-3.0 BV/h, and the final flow rate is 1.2-1.8 BV/h. Compared with a brine adsorption process with a constant flow rate, with such an initial flow rate and final flow rate of brine, the adsorption efficiency of lithium in brine can be increased by 5%-20%. BV generally refers to the filling volume of lithium adsorbent, and 2.0-3.0 BV/h (the same below) represents that the flow rate of brine in volume is 2-3 times the volume of the lithium adsorbent per hour. In some embodiments, the initial flow rate may be specifically 2.0 BV/h, 2.1 BV/h, 2.2 BV/h, 2.3 BV/h, 2.4 BV/h, 2.5 BV/h, 2.6 BV/h, 2.7 BV/h, 2.8 BV/h, 2.9 BV/h or 3.0 BV/h. The final flow rate may be specifically 1.2 BV/h, 1.3 BV/h, 1.4 BV/h, 1.5 BV/h, 1.6 BV/h, 1.7 BV/h or 1.8 BV/h.

In some embodiments of the present disclosure, during the adsorption process, a total amount of the salt lake brine to be adsorbed is 6-8 BV That is, the volume of salt lake brine to be brought into contact with the lithium adsorbent is 6-8 times the loading volume of the lithium adsorbent. The amount of salt lake brine to be adsorbed can vary depending on the level of lithium in the salt lake brine (usually 180-300 ppm). In some embodiments of the present disclosure, a total adsorption time can be 2.5-4 h, for example, 2.8 h, 3 h, 3.5 h, and 3.8 h.

In some embodiments of the present disclosure, in Step (1), before the salt lake brine flows through the lithium adsorbent at a varying rate, the method further includes filtering the brine, to remove impurities (for example, particulate impurities) therein. Filtration may sequentially include high-speed centrifugal filtration and backwash filtration. High-speed centrifugal filtration is mainly used to remove large particulate sediment. High-speed centrifugal filtration can be carried out in a centrifugal solid-liquid separator at a centrifugation speed of 15000-35000 rpm. Backwash filtration is provided for further polishing filtration, to make the salt lake brine have fewer solid impurities to ensure that the material after the filtration does not affect the adsorption function of the lithium adsorbent, and the filtered impurities can be easily backwashed off, without frequently renewing the filter consumables. Backwash filtration can be carried out with a stainless steel mesh-type backwash filter.

In the present disclosure, lithium extraction from salt lake brine is achieved by adsorption. The lithium adsorbent can be packed in a carrier such as an exchange column (e.g., glass column or stainless steel column) or an adsorption tower. When the salt lake brine flows through the carrier containing the lithium adsorbent, and is brought into contact with the lithium adsorbent, the lithium ions therein can be adsorbed and fixed by the lithium adsorbent, during which the lithium adsorbent is also transformed into a lithium-rich adsorbent with lithium adsorbed.

In an embodiment of the present disclosure, the lithium adsorbent used may include an adsorbent material and a binder. The adsorbent material may be, for example, an aluminum-based adsorbent material, a manganese-based adsorption material (such as a combination of spinel-type manganese oxide and lithium ions), a titanium-based adsorbent material (such as a metatitanate lithium ion sieve adsorbent), and an iron-based adsorbent, etc. In some embodiments of the present disclosure, the adsorbent material is an aluminum-based adsorbent material. The aluminum-based adsorbent material can be a combination of aluminum hydroxide and a lithium-containing compound (such as lithium halide, and lithium sulfate, etc.). The adsorbent material can adsorb lithium ions from a lithium-containing solution. After reaching saturated adsorption, the lithium ions are eluted off with water at a certain temperature, to release into a solution. In some embodiments, the aluminum-based adsorbent material can be represented by $Li_a X \cdot mAl(OH)_3 \cdot nH_2O$, where X may be $Cl^-$, and $SO_4^{2-}$; a=1 or 2; m is 1-5; and n is 1-5. In some embodiments, m may be 2. Further, to give a higher lithium adsorption capacity of the lithium adsorbent of the present disclosure, before flowing the salt lake brine through a lithium adsorbent at a varying rate, desorbing the lithium ions from the lithium adsorbent to allow the adsorbent material to have more lithium vacancies. The aluminum-based adsorbent material after lithium desorption can be expressed as $(1-x)Li_aX \cdot mAl(OH)_3 \cdot nH_2O$, in which $0<x<1$. The aluminum-based adsorbent material can be synthesized by a mechano-chemical method, or by soaking, acidification conversion, and precipitation, etc. For example, $LiCl \cdot mAl(OH)_3 \cdot nH_2O$ can be prepared by soaking aluminum hydroxide in a LiCl solution, or by immersing aluminum hydroxide in a LiOH solution followed by acidification and conversion, or by co-precipitation of $AlCl_3$ and a LiCl solution, or by grinding LiOH and aluminum hydroxide.

The binder can be one or more of an epoxy resin, a phenolic resin, polyvinyl chloride, polyethylene, polypropylene, polystyrene, polyvinylidene fluoride, an ethylene-vinyl acetate copolymer, a vinylidene fluoride-chlorotrifluoroethylene copolymer (referred to as VDF-CTFE copolymer) or a fluoroolefin-vinyl ether copolymer (also known as FEVE type fluorocarbon resin).

In some embodiments, the binder is at least one of a vinylidene fluoride-chlorotrifluoroethylene copolymer or a fluoroolefin-vinyl ether copolymer. In this case, the lithium adsorbent also includes a wetting and dispersing agent, and the wetting and dispersing agent comprises one or more of polyethylene glycol, sodium polyacrylate, polyvinyl alcohol, or a formaldehyde condensate. The formaldehyde condensates may include, but are not limited to, one or more of a naphthalenesulfonate formaldehyde condensate, a methylnaphthalenesulfonate formaldehyde condensate, a benzylnaphthalenesulfonate formaldehyde condensate, a phenolsulfonate formaldehyde condensate, or the like.

Using vinylidene fluoride-chlorotrifluoroethylene copolymer and/or fluoroolefin-vinyl ether copolymer as binder, the lithium adsorbent not only has a higher structural stability and mechanical strength, a good corrosion resistance, a low dissolution loss rate, and a long service life of the adsorbent after several cycles of lithium absorption-lithium desorption, but also has a suitable porosity and surface state with a narrow pore size. As a result, the lithium adsorbent is caused to have a high lithium adsorption efficiency, the adsorption speed and efficiency of the lithium adsorbent may not be affected due to the reduction of the effective active area. The wettability of the wetting and dispersing agent also contribute to the improvement of the adsorption efficiency and adsorption capacity of the adsorbent for lithium ions. In addition, with the synergistic effect of the excellent surface smoothness and cleaning effect of the two binders and the wettability of the wetting and dispersing agent, the lithium adsorbent is easy to clean after adsorbing lithium, and the process of lithium desorption is convenient. This saves water in the cleaning and desorption process, reduces the rate of dissolution loss of the adsorbent in these processes, and lowers the desorption temperature, thus being of great significance for industrialized lithium extraction in areas with high energy shortages such as salt lakes. Qualified desorption solution with a low magnesium-lithium ratio and high lithium content is obtained.

In some embodiments of the present disclosure, a molecular weight of the vinylidene fluoride-chlorotrifluoroethylene copolymer or the fluoroolefin-vinyl ether copolymer can be 100,000-800,000. Appropriate high-molecular-weight binder has better bonding effect, and reduces the risk of cracking and breaking of the lithium adsorbent during use, thus extending the service life. In the vinylidene fluoride-chlorotrifluoroethylene copolymer, the copolymerization ratio of the vinylidene fluoride and chlorotrifluoroethylene can be 1:(1-5). In some embodiments, the copolymerization ratio of the vinylidene fluoride and chlorotrifluoroethylene can be 1:4. In some embodiments, the binder is a vinylidene fluoride-chlorotrifluoroethylene copolymer, or a mixture of a vinylidene fluoride-chlorotrifluoroethylene copolymer and a fluoroolefin-vinyl ether copolymer.

In some embodiments of the present disclosure, a molecular weight of the formaldehyde condensate is 4000-10000; and a molecular weight of the sodium polyacrylate is 5000-10000.

In some embodiments of the present disclosure, the wetting and dispersing agent is polyethylene glycol. Polyethylene glycol has good wetting and dispersing abilities. In some embodiments, a molecular weight of the polyethylene glycol is 10000-30000. Higher-molecular-weight polyethylene glycol is less soluble in water with the adsorbent, making the adsorbent have a longer service life.

In an embodiment of the present disclosure, with a combination of the adsorbent material, the binder, and the wetting and dispersing agent in an appropriate proportion, the lithium adsorbent has a good structural stability, an adsorption effect and a desorption effect. In some embodiments, the content of the adsorbent material is 85-92 wt %. In some embodiments, the content of the binder is 5-15 wt %, and in some embodiments, the content of the binder is 6-12 wt %. In some embodiments of, the content of the wetting and dispersing agent is 1-3 wt %.

In some embodiments of the present disclosure, the binder is 8-12.5 wt % of the adsorbent material. An appropriate amount of the binder can not only ensure a high structural stability and a long service life (not easy to break) of the lithium adsorbent, but also weaken its reducing effect on the adsorption capacity of the obtained lithium adsorbent.

In an embodiment of the present disclosure, the wetting and dispersing agent is 1-5 wt % of the adsorbent material. At this time, the wetting and dispersing agent allows the adsorbent material to be more uniformly distribute in the lithium adsorbent particles, the structure to become more stable, and the lithium adsorbent particles to have an improved wettability, and thus an increased rate of adsorption/desorption of lithium. In addition, the wetting and dispersing agent can also be dissolved relatively slowly in brine, to increase the porosity of the lithium adsorbent slowly, thus further improving the adsorption efficiency of the lithium adsorbent without causing a significant impact on the dissolution loss rate of the adsorbent and reducing the service life of the adsorbent obviously.

In some embodiments of the present disclosure, a ratio of the weight of a adsorbent material to a total weight of the binder and the wetting and dispersing agent is 8:1 or more. This contributes to the good structural stability and excellent adsorption and desorption performances of the lithium adsorbent. In some embodiments, the ratio can be in the range of (8-10):1. In some embodiments, the ratio can be 8.5, 9:1, or 9.5:1.

In an embodiment of the present disclosure, the lithium adsorbent may be columnar particles. The columnar lithium adsorbent particles can be formed simply, and have surface smoothness, to avoid the wear and dusting due to squeezing and friction of one other during use, and reduce the loss. In some embodiments, the particle size of the lithium adsorbent is 1.2 mm-1.8 mm, and the length is 1.5 mm-2.5 mm. A lithium adsorbent with such a shape and size gives a path that is more suitable for the diffusion of a liquids and ions, and when the adsorbent is squeezed, it is easy to leave a certain gap to facilitate the penetration of brine, thus facilitating the improvement of the adsorption efficiency for lithium ions, making the ion exchange between lithium ions and water easier during the desorption process, and thus reducing the lithium desorption temperature and the amount of desorption water to ensure that the adsorbed lithium is completely desorbed.

The above-mentioned washing process for the lithium-rich adsorbent is carried out in three steps in which the flow rate is increased from slow to fast. In the 1st wash, the flow rate is slow, to avoid the difficulty in removing the impurities in the brine caused by the formation of a coagulation layer by a large amount of high-concentration brine at a high flow rate during the wash in the carrier filled with the lithium-rich adsorbent, which greatly reduces the washing effect. In the 2nd wash, the flow rate is moderate, and the amount of detergent is large, to ensure an adequate washing time, and ensure that impurities such as magnesium adhered by the adsorbent can be fully dissolved and removed. In the 3rd wash, the flow rate is fast, and the amount of the detergent is lower than the amount of the detergent in the 2nd wash, to reduce the desorption of lithium adsorbed on the lithium-rich adsorbent into the detergent, and reduce the lithium loss during water washing. Therefore, the above washing process can wash off the impurities on the surface of the lithium-rich adsorbent, such that the weight ratio of magnesium to lithium in the desorption solution obtained by the subsequent desorption is relatively low, the amount of the detergents used is small, and the lithium loss rate during washing (i.e., the percentage by weight of lithium dissolved in the detergents relative to the total lithium adsorbed by the lithium-rich adsorbent) is 16% or less, and even 15%.

In some embodiments of the present disclosure, the difference between the detergent flow rate in the 3rd wash and the detergent flow rate in the 1st wash may be 5-9 BV/h. At this time, a better washing effect can be obtained.

The washing process can well wash off the impurities on the surface of the lithium-rich adsorbent, such that the weight ratio of magnesium to lithium in the desorption solution obtained by the subsequent desorption is much lower, for example, as low as 2:1 or less; and the lithium loss rate during washing is much lower, and is lower than 15%, which is far lower than a lithium loss rate of about 20% (or even 25%) caused by a constant-rate washing process commonly used in the industry.

In some embodiments, the amount of the first detergent can be 0.6 BV, 0.7 BV, 0.8 BV or 0.9 BV; the amount of the second detergent can be 1 BV, 1.2 BV, 1.3 BV, 1.4 BV, or 1.5 BV; and the amount of the third detergent can be 0.6 BV, 0.7 BV, 0.8 BV or 0.9 BV. Further, to reduce the lithium loss rate during washing, the total amount of each detergent in the washing process is controlled not to exceed 2.5 BV in some embodiments.

In some embodiments, the duration of the 1st wash is 6-20 min, and further can be 7-15 min (for example 9 min); the duration of the 2nd wash is 7.5-15 min, and further can be 9-13 min (for example 11 min); and the duration of the 3rd wash is 2.5-6.6 min (for example 4 min). In some embodiments, in Step (2), the total washing time can be controlled to 25 min or less, and further can be 20 min or less. As a result, a better effect of washing off the impurities can be achieved, while the lithium loss rate is reduced.

In some embodiments, the washing process includes:
i) a 1st wash of the lithium-rich adsorbent with a first detergent (i.e., the detergent for the 1st wash), to obtain a first washing effluent and a first adsorbent;
ii) a 2nd wash of the first adsorbent with a second detergent (i.e., the detergent for the 2nd wash), to obtain a second washing effluent and a second detergent; and
iii) a 3rd wash of the second adsorbent with a third detergent (i.e., the detergent for the 3rd wash), to obtain a third washing effluent and a third adsorbent. The third adsorbent here is the lithium-rich adsorbent after washing, and the desorption of the aforementioned Step (3) is also carried out with it.

In the present disclosure, the first detergent, the second detergent, and the third detergent contain a large amount of water, and can each be pure water, or recycled water (containing some inorganic metal ion impurities); and the composition of each detergent may be different. In some embodiments, the first detergent, the second detergent, and the third detergent are all pure water. In this case, the amount of pure water used is large, and the loss rate of lithium during the washing process is slightly larger.

In some other embodiments, the first detergent and the second detergent are recycled water; and the third detergent is pure water, instead of recycled water, and for example, deionized water, distilled water, clean groundwater, and tap water, etc. By using recycled water in the first 2 washes, the desorption of lithium during the washing process is inhibited; and pure water is used in the last wash, the amount of pure water is small, and a good washing effect can be ensured. In some embodiments, each detergent does not contain organic substances, and has a conductivity of 300 μs/cm or less, further 200 μs/cm or less, and furthermore 50 μs/cm or less.

Further, magnesium content in the first detergent, the second detergent, and the third detergent is decreased sequentially. In some embodiments the magnesium content in the first detergent is not higher than 50 g/L, further not higher than 30 g/L, furthermore not higher than 10 g/L; the magnesium content in the second detergent is not higher than 5 g/L; and the magnesium content in the third detergent is not higher than 100 mg/L. In some embodiments, the magnesium ion content in the first detergent is not higher than 50 g/L, and the lithium ion content is not higher than 300 mg/L. In some embodiments, the first detergent further includes other metal ions each having a concentration of not higher than 10 g/L (calcium, boron, sodium or potassium). The magnesium ion content in the second detergent is not higher than 5 g/L, and the lithium ion content is not higher than 250 mg/L.

In some embodiments of the present disclosure, an unqualified desorption solution (produced in a later stage of desorption) with a lithium concentration of not higher than 250 mg/L obtained in the desorption process of Step (3) can be used as a detergent in the 2nd wash (that is, the second detergent). After the desorption is completed, the residual water in the carrier (such as an adsorption column) packed with the lithium adsorbent can also be discharged and used as the second detergent. A third washing effluent obtained after the 3rd wash or a second washing effluent obtained after the 2nd wash can be used as a detergent in the 1st wash (that is, the first detergent). A first washing effluent obtained after the 1st wash can be fed back and mixed into the salt lake brine. As a result, during the entire washing process, pure water is only used in the 3rd wash, so the amount of pure water used is small. This brings great economic and environmental benefits in the extraction of lithium from salt lake brine in water-scarce regions. In some embodiments, the second washing effluent generally contains magnesium ions with a concentration of not higher than 50 g/L and other metal ions (calcium, lithium, boron, sodium or potassium) each having a concentration of not higher than 10 g/L, where further the lithium ion concentration can be 100-200 ppm. The third washing effluent generally contains magnesium ions with a concentration of not higher than 10 g/L, and other metal ions (for example, calcium, lithium, boron, sodium or potassium) each having a concentration of not higher than 0.5 g/L, where further, the lithium ion concentration is lower than 300 mg/L.

In Step (3) in the present disclosure, the washed lithium-rich adsorbent is eluted with a lithium ion eluent (also called a lithium desorbent), to desorb the lithium ions adsorbed on the lithium-rich adsorbent, so that the lithium ions are eluted off and released into the eluent to obtain a desorption solution. The desorption solution can be further treated and used (usually converted into lithium carbonate products). Moreover, after lithium is desorbed from the lithium-rich adsorbent, the lithium adsorbent can be regenerated, and then used to contact with salt lake brine for lithium extraction by adsorption. In the lithium extraction method, Steps (1)-(3) may form one cycle.

In some embodiments of the present disclosure, the temperature of the lithium ion eluent (i.e., the temperature of the desorption process) can be 30-50° C. In some embodiments (for example, when a lithium adsorbent containing a vinylidene fluoride-chlorotrifluoroethylene copolymer and/or a fluoroolefin-vinyl ether copolymer as a binder is used), the temperature can be 30-40° C., for example, 28° C., 30° C., 32° C., 35° C., 38° C. or 40° C., and further 30-35° C. The lithium ion eluent can be deionized water, distilled water, clean groundwater or tap water. It is also feasible to use an unqualified desorption solution that does not meet the lithium concentration requirements (generated in a later stage of desorption) for desorption of lithium in an order from high to low, to obtain a qualified desorption solution with the maximum lithium content.

In some embodiments, the flow rate of the lithium ion eluent is 1.5-2.5 BV/h, for example, 1.8 BV/h, 2 BV/h, and 2.2 BV/h. This can ensure that the lithium ion content in the desorption solution is relatively high, and the desorption time will not be too long. In some embodiments, the desorption time of the desorbing the lithium ions from the washed lithium-rich adsorbent is 2.5-4 h, for example, 2.8 h, 3 h, 3.5 h, and 3.8 h.

The composition of the salt lake brine for lithium extraction used in the following examples is shown in Table 1 below.

TABLE 1

Composition of salt lake brine

| | |
|---|---|
| Li (%) | 0.0138 |
| Na (%) | 0.2325 |
| Mg (%) | 7.0719 |
| K (%) | 0.6241 |
| Ca (%) | 0.2970 |
| B (%) | 0.0133 |
| $Cl^-$ (%) | 22.7497 |
| $SO_4^{2-}$ (%) | 0.0577 |
| Mg:Li | 222.4 |

Example 1

A flow chart of a method for extracting lithium from salt lake brine is shown in FIG. 1. The method includes the following steps:

(1) Adsorption:

A lithium adsorbent (including an aluminum-based adsorbent material $LiCl \cdot 2Al(OH)_3 \cdot nH_2O$ and a binder polyvinylidene fluoride, at a weight ratio of 9:1) is packed in a glass adsorption column in an amount of 0.9 dm³.

The salt lake brine for lithium extraction is subjected to high-speed centrifugal filtration and backwash filtration sequentially, and then flowed through the adsorption column packed with the lithium adsorbent at a varying rate, to allow lithium ions therein to be adsorbed on the lithium adsorbent and the lithium adsorbent to be transformed into a lithium-rich adsorbent. The temperature during the adsorption process is 25° C., the amount of the brine to be adsorbed is 6 BV, and 5400 mL in total. The flow rate (i.e., an initial flow rate) of the 1st BV of brine through the adsorption column is 2.5 BV/h, and the adsorption time is 24 min. The flow rate of the 2nd BV of brine is 2.3 BV/h, and the adsorption time is 26 min. The flow rate of the 3rd BV of brine is 2.1 BV/h, and the adsorption time is 28 min. The flow rate of the 4th BV of brine is 2.0 BV/h, and the adsorption time is 30 min. The flow rate of the 5th BV of brine is 1.8 BV/h, and the adsorption time is 33 min. The flow rate (i.e., the final flow rate) of the 6th BV of brine is 1.3 BV/h, and the adsorption time is 38 min. The total adsorption time of the adsorption process is about 3 h.

(2) Washing of Lithium-Rich Adsorbent:

The adsorption column with the lithium-rich adsorbent is washed with clean water to remove the impurities adsorbed on the surface of the lithium-rich adsorbent. The whole washing process is carried out in 3 steps, in which the total amount of the detergents is 2250 mL (that is, 2.5 BV), and the total washing time is 20 min. The washing process includes the following:

a) 1st wash: A third washing effluent from a 3rd wash in a previous cycle (having a composition with a $Li^+$ content of 210 mg/L and a $Mg^{2+}$ content of 10 g/L) is used as a first detergent to wash the lithium-rich adsorbent, where the amount of the first detergent is 0.6 BV, the flow rate is 4.5 BV/h, and the washing time is 8 min. After the 1st washing, a first adsorbent and a first washing effluent are obtained. The first washing effluent can be fed back and mixed into the salt lake brine.

b) 2nd wash: An unqualified desorption solution collected at a later stage of a previous cycle of desorption (having a composition with a $Li^+$ content of 105 mg/L and a $Mg^{2+}$ content of 150 mg/L) is used as a second detergent to wash the first adsorbent, where the amount in volume of the second detergent is 1.3 BV (that is, 1170 mL), the flow rate is 8.5 BV/h, and the washing time is 9 min. After the 2nd washing, a second adsorbent and a second washing effluent are obtained. The second washing effluent has a weight ratio of magnesium to lithium of 206:1, and can be collected and used in adsorption of brine again, to reduce the loss of lithium.

c) 3rd wash: Pure water is used as a third detergent in this washing procedure, where the amount in volume of pure water is 0.6 BV (5400 mL), the flow rate is 12 BV/h, and the washing time is 3 min. After the 3rd washing, a third adsorbent and a third washing effluent are obtained. The third washing effluent can be stored in a pre-storage tank and used as a first detergent in a next cycle.

(3) Desorption:

The third adsorbent was eluted with pure water (as a lithium ion eluent) at 50° C. to desorb the adsorbed lithium ions, where the amount of water is 3.3 BV, the flow rate is 1.7 BV/h, and the desorption time is 116 min. The liquid of the first 2 BV in the desorption process is collected and used as a qualified desorption solution (with a $Li^+$ content of greater than 500 mg/L), and the latter 1.3 BV as an unqualified solution is recycled and used as a washing agent.

Example 2

Example 2 differs from Example 1 in that during the adsorption process, according to the order of adsorption, the flow rate of brine is 2.8 BV/h (initial flow rate), 2.6 BV/h, 2.4 BV/h, 2.1 BV/h, 1.8 BV/h, and 1.5 BV/h (final flow rate) respectively; the adsorption time is 21.5 min, 23 min, 25 min, 28.5 min, 33 min, and 40 min, respectively; the total adsorption time is 171 min (that is, 2.85 h); and the other process conditions are the same as those in Example 1.

Example 3

Example 3 differs from Example 1 in that during the adsorption process, according to the order of adsorption, the flow rate of brine is 2 BV/h (initial flow rate), 1.8 BV/h, 1.6 BV/h, 1.4 BV/h, 1.3 BV/h, and 1.2 BV/h (final flow rate) respectively; the adsorption time is 30 min, 33.3 min, 37.5 min, 43 min, 46 min, and 50 min respectively; the total adsorption time is about 240 min; and the other process conditions are the same as those in Example 1.

Example 4

Example 4 differs from Example 1 in that the initial flow rate of brine is 3.5 BV/h, and the final flow rate is 2.0 BV/h. Particularly, according to the order of adsorption, the flow rate of the 6 BV of brine to be adsorbed is 3.5 BV/h, 3.2 BV/h, 3.0 BV/h, 2.8 BV/h, 2.5 BV/h, and 2.0 BV/h respectively; the adsorption time of each 1 BV of brine is 17 min, 18.75 min, 20 min, 21.4 min, 24 min, and 30 min respectively; and the total adsorption time is about 240 min.

Example 5

Example 5 differs from Example 1 in that the amount of brine to be adsorbed is 7.5 BV, and during the adsorption process, the flow rate of brine is decreased stepwise. 7 different flow rate intervals are included, the decrease step between adjacent flow rate intervals is 0.5 BV/h, the initial flow rate is 5 BV/h, and the final flow rate is 2 BV/h. The adsorption time of each 1.07 BV of brine is 12.9 min, 14.3 min, 16.1 min, 18.4 min, 21.4 min, 25.7 min, and 32.1 min respectively; and the total adsorption time is about 140.9 min.

Example 6

Example 6 differs from Example 1 in that the flow rate in three steps of washing is 5 BV/h, 8 BV/h, and 12 BV/h respectively; the washing time is 7 min, 10 min, and 3 min respectively; and the total washing time is 20 min. The other process conditions are the same as those in Example 1.

Example 7

Example 7 differs from Example 1 in that a constant-rate washing process is used for washing. A same flow rate of 7.5 BV/h is used in the three steps of washing, the amount of the detergent in each wash is 0.8 BV, 0.9 BV and 0.8 BV respectively, and the washing time is 384 s, 432 s, and 384 s respectively. The total time of the washing process is 20 min, and the total amount of the detergent is maintained constantly at 2.5 BV.

Example 8

Example 8 differs from Example 1 in that a constant-rate washing process is used for washing. A same flow rate of 7.5 BV/h is used in the three steps of washing, the amount of the detergent used in each wash is 0.83 BV, and the time in each wash is 6.64 min. The total time of the washing process is 20 min, and the total amount of the detergent is maintained constantly at 2.5 BV.

Example 9

Example 9 differs from Example 1 in that a constant-rate washing process is used for washing. A same flow rate of 5 BV/h is used in the three steps of washing, the amount of the detergent used in each wash is 0.83 BV, and the time in each wash is 10 min. The total amount of the detergent is maintained constantly at 2.5 BV, and the total time of the washing process is 30 min.

Example 10

Figure 2:
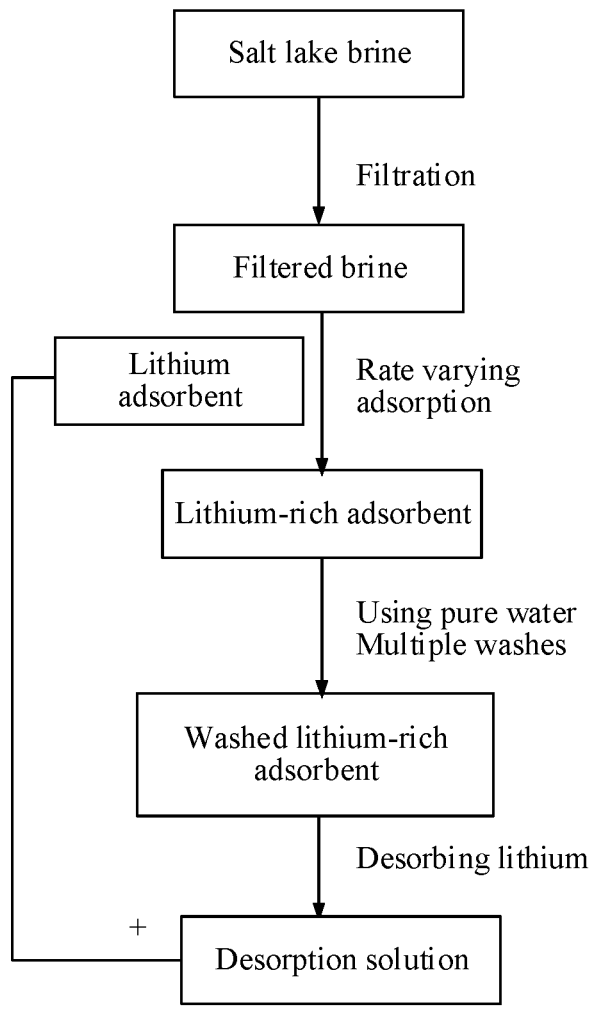
FIG. 2 shows a flow chart of a method for extracting lithium from salt lake brine provided in another embodiment of the present disclosure.

A flow chart of a method for extracting lithium from salt lake brine is shown in FIG. 2. Example 10 differs from Example 1 in that during the washing process, the detergent used in each wash is pure water (different from the 1st and 2nd wash in Example 1 in which recycled water is used).

Example 11

Example 11 differs from Example 1 in that a different lithium adsorbent is used, the desorption temperature is 30° C., and the other process parameters are the same. The lithium adsorbent used in Example 11 includes the same adsorbent material as in Example 1, but a binder that is a vinylidene fluoride-chlorotrifluoroethylene copolymer with a molecular weight of about 20,000, and also a wetting and dispersing agent that is polyethylene glycol with a molecular weight of 10,000, where the weight ratio of the adsorbent material, the binder and the wetting and dispersing agent (polyethylene glycol) is 9:0.9:0.1.

Example 12

Example 12 differs from Example 11 in that in the method for extracting lithium from salt lake brine, the binder used in the lithium adsorbent is a FEVE-type fluorocarbon resin.

Example 13

Example 13 differs from Example 11 in that in the method for extracting lithium from salt lake brine, the binder used in the lithium adsorbent is a VDF-CTFE copolymer and a FEVE-type fluorocarbon resin at a weight ratio of 1:1.

Example 14

Example 14 differs from Example 11 in that the weight ratio of the adsorbent material, the binder, and polyethylene glycol is 9.5:0.4:0.1.

Example 15

The lithium adsorbent in Example 15 differs from that in Example 11 in that the molecular weight of the binder (VDF-CTFE copolymer) is 200,000.

Example 16

The lithium adsorbent in Example 16 differs from that in Example 11 in that the molecular weight of the binder (VDF-CTFE copolymer) is 600,000.

Example 17

The lithium adsorbent in Example 17 differs from that in Example 11 in that the wetting and dispersing agent used is sodium polyacrylate with a molecular weight of 6,000.

To highlight the beneficial effects of the examples of the present disclosure, the following comparative examples are provided.

Comparative Example 1

Comparative Example 1 differs from Example 1 in that a constant-rate adsorption process is used for adsorption, where the salt lake brine is flowed through the lithium adsorbent at a flow rate of 2.5 BV/h, and the adsorption time is still 3 h.

Comparative Embodiment 2

Comparative Example 2 differs from Example 1 in that a constant-rate adsorption process is used for adsorption in Step (1), the salt lake brine is flowed through the lithium adsorbent at a flow rate of 2.5 BV/h, and the adsorption time is still 3 h; and a constant-rate washing process is used for washing in Step (2), where a same flow rate of 7.5 BV/h is used in the three steps of washing, the amount of the detergent used in each wash is 0.83 BV, and the time in each wash is 6.64 min. The total time of the washing process is 20 min, and the total amount of the detergent is maintained constantly at 2.5 BV.

To provide support for the effect of the examples of the present disclosure, the adsorbed amount, the total adsorption time, the adsorption yield of lithium in the adsorption process, the lithium loss rate during washing, and the lithium content and the ratio of magnesium to lithium in the finally obtained desorption solution in the method of each example and comparative example are determined. The amount of lithium adsorbed is determined by a ratio of the weight of lithium adsorbed by the adsorbent (i.e., the difference between the weight of the lithium element in brine after adsorption and in brine before adsorption) to the weight of the adsorbent. The adsorption yield is expressed by the ratio of the weight of lithium adsorbed by the lithium adsorbent to the weight of lithium in the original brine. The lithium loss rate during washing is a ratio of the weight of element lithium in the washing effluent obtained after washing (the washing effluent obtained after the final wash if there are multiple steps of wash) to the total amount of lithium adsorbed by the lithium-rich adsorbent.

The above results are summarized in Table 2 below.

TABLE 2

Summary of the results of each example and comparative example

| No. | Amount of lithium adsorbed (mg/g) | Total adsorption time (min) | Adsorption yield (%) | Lithium loss rate during washing (%) | Lithium content in desorption solution (mg/L) | Ratio of magnesium to lithium in desorption solution | Amount of pure water for washing (non-recycled water) |
|---|---|---|---|---|---|---|---|
| Example 1 | 2.5 | 180 | 80 | 13 | 543 | 2:1 | 0.6 BV |
| Example 2 | 2.4 | 171 | 77 | 13 | 530 | 2:1 | 0.6 BV |
| Example 3 | 2.7 | 240 | 86 | 13 | 577 | 1.9:1 | 0.6 BV |
| Example 4 | 2.0 | 131.15 | 64 | 13 | 510 | 2.2:1 | 0.6 BV |
| Example 5 | 2.2 | 140.9 | 70 | 13 | 518 | 2.1:1 | 0.6 BV |
| Example 6 | 2.5 | 180 | 80 | 14 | 534 | 2.1:1 | 0.6 BV |
| Example 7 | 2.5 | 180 | 80 | 17 | 529 | 3:1 | 0.8 BV |
| Example 8 | 2.5 | 180 | 80 | 19 | 513 | 3.3:1 | 0.83 BV |
| Example 9 | 2.5 | 180 | 80 | 20 | 501 | 3.2:1 | 0.83 BV |
| Example 10 | 2.5 | 180 | 80 | 22 | 487 | 1.8:1 | 2.5 BV |
| Example 11 | 2.55 | 180 | 82 | 13 | 556 | 2:1 | 0.6 BV |
| Example 12 | 2.42 | 180 | 77.5 | 14 | 544 | 2:1 | 0.6 BV |
| Example 13 | 2.48 | 180 | 79.4 | 13 | 548 | 2:1 | 0.6 BV |
| Example 14 | 2.6 | 180 | 83 | 16 | 539 | 2:1 | 0.6 BV |
| Example 15 | 2.58 | 180 | 82.6 | 13.1 | 563 | 2:1 | 0.6 BV |
| Example 16 | 2.57 | 180 | 82.2 | 13.2 | 560 | 2:1 | 0.6 BV |
| Example 17 | 2.52 | 180 | 80.6 | 13 | 551 | 2:1 | 0.6 BV |
| Comparative Example 1 | 2.1 | 180 | 67 | 14 | 501 | 2.2:1 | 0.6 BV |
| Comparative Example 2 | 2.1 | 180 | 67 | 20 | 440 | 3.4:1 | 0.83 BV |

Generally, when lithium is extracted using the same adsorbent at the same temperature, the longer the total adsorption time is, the higher the adsorption efficiency will be. As can be seen from Table 2, with the same adsorbent and the same total adsorption time, the adsorption efficiency of the rate-varying adsorption process (Example 1) is much higher than the adsorption efficiency of the constant-rate adsorption process (Comparative Examples 1-2). Example 2-5 has different adsorption time from Example 1. However, when the total adsorption time is short, Examples 2, 4, and 5 still have a quite high adsorption efficiency. In addition, using a washing process at a rate varying from slow to fast, the lithium loss rate during the washing process can be effectively reduced (Examples 1 and 6). In the constant-rate washing process (Examples 7-9), the lithium loss rate is slightly higher, and the ratio of magnesium to lithium in the obtained desorption solution is slightly higher (similar cases in Comparative Example 2 and Comparative Example 1). In addition, the lithium loss rate where pure water is used for washing throughout the process (Example 10) is higher than the lithium loss rate where recycled water and pure water are used for washing (Example 1).

In addition, it can be known from the comparison of Examples 11-14 with Example 1 that when an adsorbent with at least one of a vinylidene fluoride-chlorotrifluoroethylene copolymer and a fluoroolefin-vinyl ether copolymer as a binder and containing a wetting and dispersing agent is used, the desorption temperature is lower, and the lithium ion concentration in the lithium desorption solution is basically the same as that of Example 1. When the lithium ion concentration in the lithium desorption solution is comparable, the energy can be saved largely with the decreasing of the desorption temperature in the example. For the salt lake area where water and power resource are scarce, the water and power consumption are of great significance to the production cost and capacity. The costs of tap water, and pure water, etc., are often 3-5 more times that of other regions. In addition, Examples 15-16 differ from Example 11 in that the molecular weight of the binder VDF-CTFE copolymer is different. The binder in Examples 15-16 has a molecular weight in the range of 100,000-800,000, and has a desorption effect that is better than that in Example 11 where the binder has a molecular weight of 20,000 when other conditions are the same. In Examples 17 and Example 11, the wetting and dispersing agents are different. The desorption effect in Example 11 where polyethylene glycol is used as a wetting and dispersing agent is slightly better than that in Example 17 where sodium polyacrylate is used as a wetting and dispersing agent.

In general, in the lithium extraction method provided in the examples of the present disclosure, a specific rate varying adsorption process is used, to achieve a high adsorption efficiency of lithium in brine, and achieve high-efficiency lithium adsorption at a low temperature. Thus, a reasonable lithium desorption solution is ensured to be obtained.

The foregoing are some embodiments of the present disclosure. It should be noted that, a person skilled in the art can also make several improvements and modifications without departing from the principles of the present disclosure, and these improvements and modifications shall fall within the protection scope of the present disclosure.

What is claimed is:

1. A method for extracting lithium from salt lake brine, comprising:
    flowing the salt lake brine through a lithium adsorbent at a varying flow rate to obtain a lithium-rich adsorbent, wherein lithium ions in the salt lake brine are adsorbed on the lithium adsorbent, and wherein during the adsorption process, the flow rate of the salt lake brine decreases, and a difference between an initial flow rate of the salt lake brine and a final flow rate of the salt lake brine is 0.5-3 BV/h;
    washing the lithium-rich adsorbent; and
    desorbing the lithium ions from the washed lithium-rich adsorbent with a lithium ion eluent, to obtain a desorption solution.

2. The method according to claim 1, wherein the initial flow rate of the salt lake brine is 2.0-3.0 BV/h, and the final flow rate of the salt lake brine is 1.2-1.8 BV/h.

3. The method according to claim 1, wherein a total amount of the salt lake brine to be adsorbed is 6-8 BV, and a total adsorption time of the salt lake brine is 2.5-4 h.

4. The method according to claim 1, wherein
    the washing the lithium-rich adsorbent comprises a first wash, a second wash, and a third wash; and
    a flow rate of a first detergent in the first wash, a flow rate of a second detergent in the second wash, and a flow rate of a third detergent in the third wash are increased sequentially, and an amount of the second detergent is greater than an amount of the first detergent or an amount of the third detergent.

5. The method according to claim 4, wherein
    in the first wash, the flow rate of the first detergent is 3-5 BV/h, and the amount of the first detergent is 0.5-1 BV;
    in the second wash, the flow rate of the second detergent is 6-8 BV/h, and the amount of the second detergent is 1-1.5 BV; and
    in the third wash, the flow rate of the third detergent is 9-12 BV/h, and the amount of the third detergent is 0.5-1 BV.

6. The method according to claim 4, wherein the first detergent comprises an aqueous solution having magnesium ions with a concentration of 50 g/L or less and lithium ions with a concentration of 300 mg/L or less; the second detergent comprises an aqueous solution having magnesium ions with a concentration of 5 g/L or less and lithium ions with a concentration of 250 mg/L or less; and the third detergent is pure water.

7. The method according to claim 1, wherein during desorbing the lithium ions, the lithium ion eluent is water, and a temperature is controlled at 30-50° C.

8. The method according to claim 1, wherein the lithium adsorbent comprises an adsorbent material, a binder, and a wetting and dispersing agent, the binder comprises at least one of a vinylidene fluoride-chlorotrifluoroethylene copolymer or a fluoroolefin-vinyl ether copolymer, and the wetting and dispersing agent comprises one or more of polyethylene glycol, sodium polyacrylate, polyvinyl alcohol, or a formaldehyde condensate.

9. The method according to claim 8, wherein based on a weight of the lithium adsorbent, a content of the adsorbent material is 80-95 wt %, a content of the binder is 4-17 wt %, and a content of the wetting and dispersing agent is 1-5 wt %.

10. The method according to claim 8, wherein a ratio of a weight of the adsorbent material to a total weight of the binder and the wetting and dispersing agent is 8:1 or more.

11. The method according to claim 8, wherein the binder is 8-12.5 wt % of the adsorbent material.

12. The method according to claim 8, wherein a molecular weight of the vinylidene fluoride-chlorotrifluoroethylene copolymer or the fluoroolefin-vinyl ether copolymer is 100,000-800,000.

13. The method according to claim 1, before flowing the salt lake brine through the lithium adsorbent at the varying flow rate, desorbing the lithium ions from the lithium adsorbent.

14. The method according to claim 1, a flow rate of the lithium ion eluent is 1.5-2.5 BV/h.

15. The method according to claim 1, a desorption time of desorbing the lithium ions from the washed lithium-rich adsorbent is 2.5-4 h.

* * * * *